No. 635,189. Patented Oct. 17, 1899.
J. ROMBACH.
REGISTER FOR MEASURING FAUCETS.
(Application filed Mar. 31, 1898.)
(No Model.) 2 Sheets—Sheet 1.
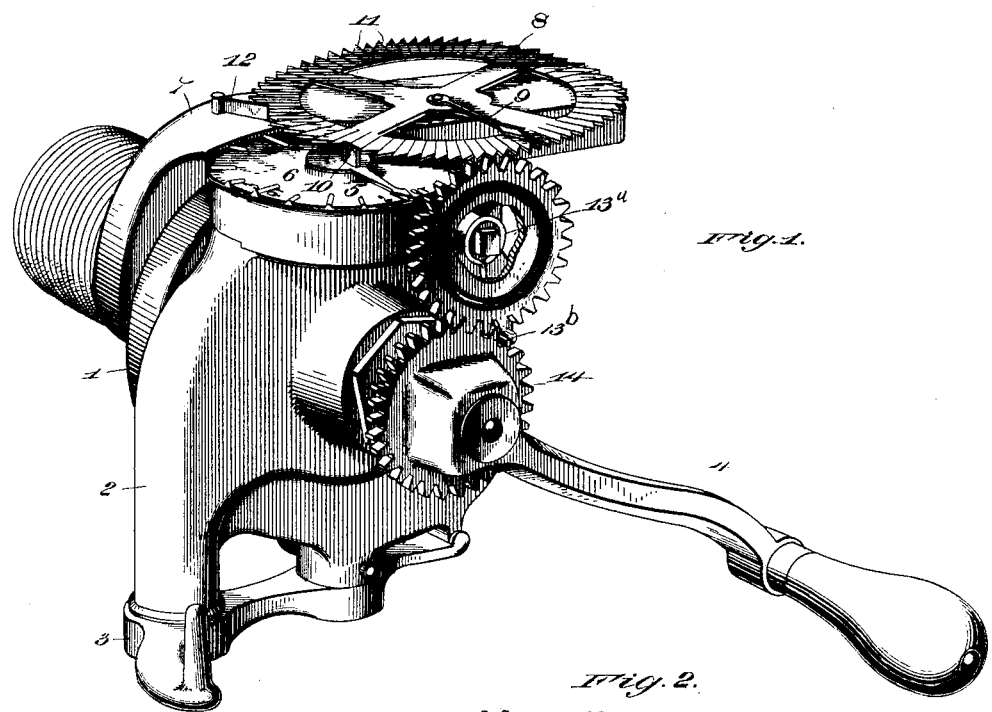
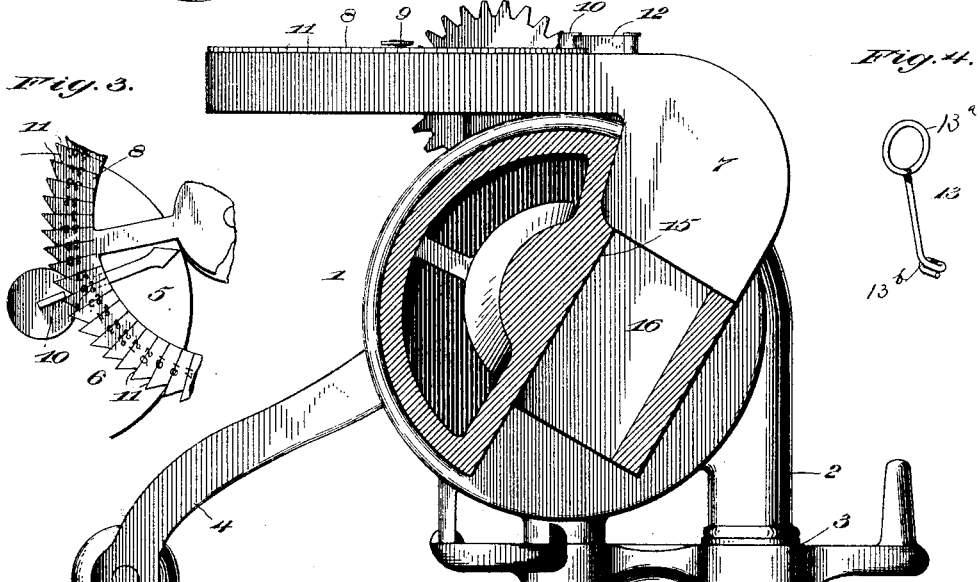
Witnesses Inventor
John Rombach
By his Attorneys.
THE NORRIS PETERS CO., PHOTO-LITHO., WASHINGTON, D. C.

No. 635,189. Patented Oct. 17, 1899.
J. ROMBACH.
REGISTER FOR MEASURING FAUCETS.
(Application filed Mar. 31, 1898.)
(No Model.) 2 Sheets—Sheet 2.

Witnesses
J. L. Edwards Jr.

John Rombach Inventor
By his Attorneys,
C. A. Snow & Co.

UNITED STATES PATENT OFFICE.

JOHN ROMBACH, OF WESTON, WEST VIRGINIA, ASSIGNOR OF ONE-HALF TO EDWARD A. BENNETT, OF SAME PLACE.

REGISTER FOR MEASURING-FAUCETS.

SPECIFICATION forming part of Letters Patent No. 635,189, dated October 17, 1899.

Application filed March 31, 1898. Serial No. 675,941. (No model.)

*To all whom it may concern:*

Be it known that I, JOHN ROMBACH, a citizen of the United States, residing at Weston, in the county of Lewis and State of West Virginia, have invented a new and useful Register for Measuring-Faucets, of which the following is a specification.

My invention relates to measuring-faucets, and particularly to a total-registering attachment for use in connection with measuring-faucets, whereby without interfering with the functions of the other features of the apparatus the register of the total amount of liquid drawn through the faucet may be kept as a means of ascertaining the remaining contents of the barrel or cask.

Further objects and advantages of this invention will appear in the following description and the novel features thereof will be particularly pointed out in the appended claims.

Figure 5:
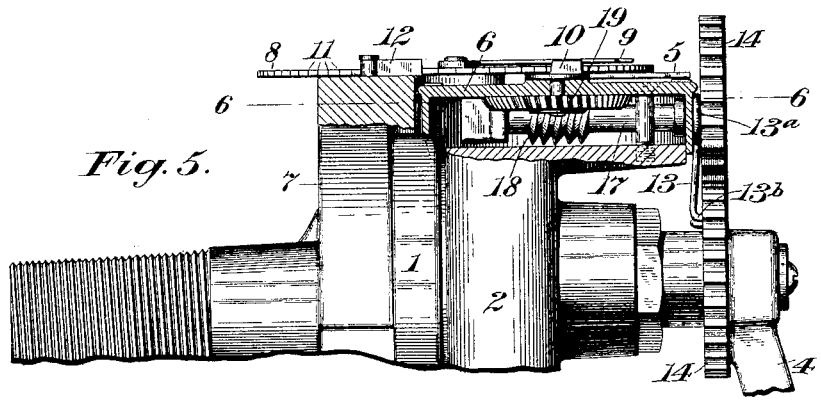
Figure 6:
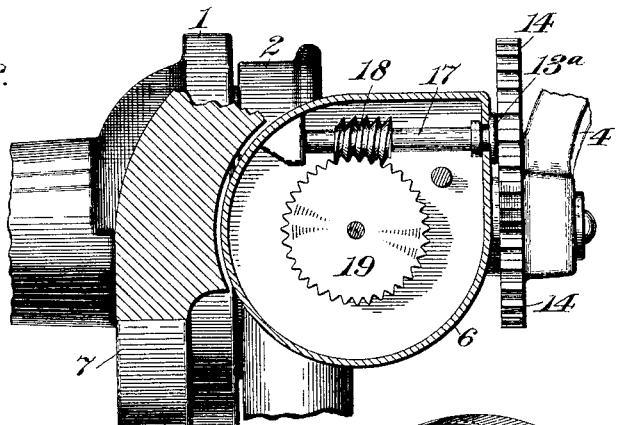
Figure 7:
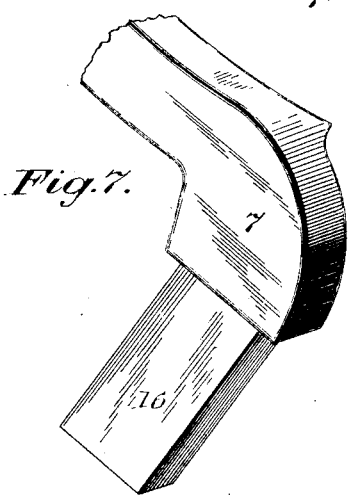
Figure 8:
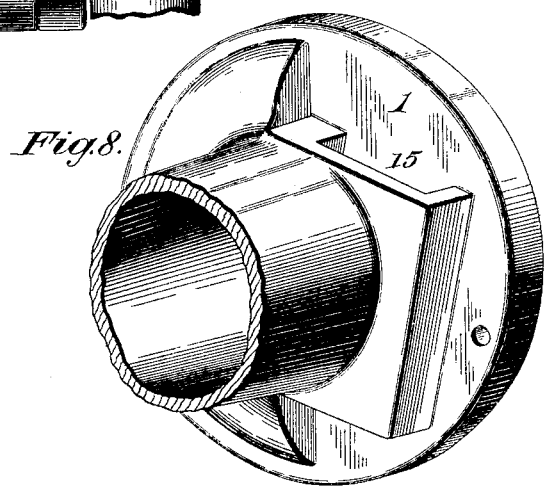

In the drawings, Figure 1 is a perspective view of a measuring-faucet constructed in accordance with my invention. Fig. 2 is a rear view, partly in section, of the same. Fig. 3 is a partial plan view of the device to show the means for communicating motion to the indicator-disk. Fig. 4 is a detail view of the stop-pawl detached. Fig. 5 is a vertical sectional view of a portion of the apparatus to show the means whereby motion is communicated to the pointer. Fig. 6 is a horizontal section of the same on the plane indicated by the line 6 6 of Fig. 5. Fig. 7 is a detail view in perspective of a portion of the attachment to show the means whereby the same is mounted upon the faucet. Fig. 8 is a detail view in perspective of a portion of the faucet, viewing the same from the rear, to show the seat in which the tongue of the bracket is removably fitted.

Similar numerals of reference indicate corresponding parts in all the figures of the drawings.

1 designates the body portion of a faucet having a nozzle 2 fitted with a closing-valve 3, 4 an operating crank or handle by which the interior measuring devices of the faucet are controlled, and 5 a pointer operatively connected with the handle or crank and mounted to traverse a fixed indicating-dial 6, all of the ordinary or any preferred construction, whereby when the valve is turned to open the nozzle the rotation of the crank or handle will cause molasses or other liquid to flow at a rate indicated by the index or pointer, the interior construction of the nozzle not being illustrated, as it forms no part of my present invention.

Mounted for rotary movement upon a suitable bracket 7 is a registering-disk 8, so connected with the pointer or index of the measuring device as to receive a step-by-step motion therefrom, said registering-disk having a series of indicating characters or numerals representing units of liquid measure, such as a gallon, and the disk being mounted to operate contiguous to a fixed pointer 9, also preferably supported by the said bracket. In the construction illustrated the index or pointer 5 of the measuring-disk is provided with an operating or feed tooth 10, adapted to successively engage ratchet-teeth or notches 11 in the periphery of the registering-disk, and thus move said registering-disk forward one step for each complete revolution of the index or pointer of the measuring device. A stop-pawl 12 is also arranged in operative relation with the peripheral teeth of the registering-disk to prevent accidental backward rotation of the latter, and I preferably employ a stop-pawl 13 in operative relation with one of the gears 14 of the measuring apparatus to prevent accidental rotation of the operating handle or crank in a backward direction, as it is obvious that the proper operation of the total-registering mechanism necessitates the operation of the handle or crank in a uniform direction. The stop-pawl 13, which is shown in the drawings, consists of a shank terminating at one end in a bearing-eye $13^a$, which is mounted upon the spindle 17 of one of said gears, said spindle terminating in a worm 18, which meshes with a worm-gear 19, attached to the spindle of the pointer 5. The other end of the shank of said stop-pawl is provided with a tooth $13^b$, which is adapted to occupy a position in the interval between two teeth of one of the gears 14, whereby forward rotation of said gear is possible, but backward rotation thereof is prevented.

It is common in measuring-faucets, particularly of the class illustrated in the drawings, to provide the rear side thereof with a seat 15 in the form of a socket to receive a lever or bar, whereby the threading of the shank or tube of the faucet into the bung of a barrel or cask may be facilitated, and this seat I utilize as a means of applying the attachment, including the registering-disk, to a faucet of the class specified. The bracket 7 is provided with a tongue 16, adapted to fit in the seat, and thereby support the body portion of the bracket in such a position as to dispose the indicating or registering disk in operative relation with the operating-tooth on the index or pointer of the measuring device. It will be understood, however, that other means may be employed for supporting the registering-disk in operative relation with the measuring devices of the faucet, and hence I desire to be understood as not limiting myself to the specific construction illustrated; also, other changes in the form, proportion, and the minor details of construction may be resorted to without departing from the spirit or sacrificing any of the advantages of this invention.

Having described my invention, what I claim is—

1. The combination with a faucet provided with a socket, a revoluble pointer, means to rotate said pointer, and an operating-tooth on the pointer, of a total-registering attachment embodying a bracket having a tongue removably fitted in said socket, a toothed indicating-disk mounted on the bracket and adapted to be engaged by the operating-tooth on the pointer, and a fixed pointer for said disk, substantially as described.

2. The combination with a measuring-faucet provided with a socket, a pointer, means to rotate said pointer, and an operating-tooth projecting from the pointer, of a bracket having a tongue to removably fit said socket, and a revoluble disk carried by the bracket and provided with uniformly-spaced peripheral teeth, the path of travel of which intersects that of the operating-tooth on the pointer, substantially as and for the purpose set forth.

In testimony that I claim the foregoing as my own I have hereto affixed my signature in the presence of two witnesses.

JOHN ROMBACH.

Witnesses:
JOHN H. SIGGERS,
HAROLD H. SIMMS.